US009632777B2

(12) United States Patent
Fleischer et al.

(10) Patent No.: US 9,632,777 B2
(45) Date of Patent: *Apr. 25, 2017

(54) GATHER/SCATTER OF MULTIPLE DATA ELEMENTS WITH PACKED LOADING/STORING INTO/FROM A REGISTER FILE ENTRY

(75) Inventors: Bruce M. Fleischer, Bedford Hills, NY (US); Thomas W. Fox, Hopewell Junction, NY (US); Hans M. Jacobson, White Plains, NY (US); Jaime H. Moreno, Dobbs Ferry, NY (US); Ravi Nair, Briarcliff Manor, NY (US); Daniel A. Prener, Croton-on-Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 761 days.

This patent is subject to a terminal disclaimer.

(21) Appl. No.: 13/566,141

(22) Filed: Aug. 3, 2012

(65) Prior Publication Data
US 2014/0040596 A1 Feb. 6, 2014

(51) Int. Cl.
*G06F 9/30* (2006.01)

(52) U.S. Cl.
CPC ...... *G06F 9/30043* (2013.01); *G06F 9/30036* (2013.01)

(58) Field of Classification Search
CPC .................. G06F 9/30036; G06F 9/30043
See application file for complete search history.

(56) References Cited

U.S. PATENT DOCUMENTS

| 3,287,703 A | 11/1966 | Slotnick |
| 4,980,817 A | 12/1990 | Fossum et al. |
| 5,063,497 A | 11/1991 | Cutler et al. |

(Continued)

OTHER PUBLICATIONS

Ergin et al, Register Packing: Exploiting Narrow-width operands for reducing register file pressure, IEEE, 1072-4451/04, 12 pages, retrieved from the internet on May 7, 2015, retrieved from URL <http://ieeexplore.ieee.org/stamp/stamp.jsp?tp=&arnumber=1551003>.*

(Continued)

*Primary Examiner* — Andrew Caldwell
*Assistant Examiner* — Jyoti Mehta
(74) *Attorney, Agent, or Firm* — Cantor Colburn LLP

(57) ABSTRACT

Embodiments relate to packed loading and storing of data. An aspect includes a method for packed loading and storing of data distributed in a system that includes memory and a processing element. The method includes fetching and decoding an instruction for execution by the processing element. The processing element gathers a plurality of individually addressable data elements from non-contiguous locations in the memory which are narrower than a nominal width of register file elements in the processing element based on the instruction. The data elements are packed and loaded into register file elements of a register file entry by the processing element based on the instruction, such that at least two of the data elements gathered from the non-contiguous locations in the memory are packed and loaded into a single register file element of the register file entry.

18 Claims, 13 Drawing Sheets

(56) References Cited

U.S. PATENT DOCUMENTS

| | | | |
|---|---|---|---|
| 5,115,393 | A | 5/1992 | Kashiyama et al. |
| 5,163,139 | A | 11/1992 | Haigh et al. |
| 5,437,043 | A | 7/1995 | Fujii et al. |
| 5,544,337 | A | 8/1996 | Beard et al. |
| 5,568,380 | A | 10/1996 | Brodnax et al. |
| 5,784,706 | A | 7/1998 | Oberlin et al. |
| 5,832,290 | A | 11/1998 | Gostin et al. |
| 5,903,769 | A | 5/1999 | Arya |
| 5,922,066 | A * | 7/1999 | Cho ................... G06F 5/015 712/204 |
| 5,987,600 | A | 11/1999 | Papworth et al. |
| 6,078,969 | A * | 6/2000 | Ichimura ............ G05B 19/052 710/260 |
| 6,079,008 | A | 6/2000 | Clery, III |
| 6,085,315 | A | 7/2000 | Fleck et al. |
| 6,173,366 | B1 * | 1/2001 | Thayer et al. ................ 711/129 |
| 6,253,287 | B1 | 6/2001 | Green |
| 6,317,819 | B1 | 11/2001 | Morton |
| 6,332,186 | B1 | 12/2001 | Elwood et al. |
| 6,366,999 | B1 | 4/2002 | Drabenstott et al. |
| 6,539,467 | B1 * | 3/2003 | Anderson et al. ............ 711/219 |
| 6,785,842 | B2 | 8/2004 | Zumkehr et al. |
| 6,839,828 | B2 | 1/2005 | Gschwind et al. |
| 6,889,307 | B1 | 5/2005 | Scheuerlein |
| 6,950,923 | B2 | 9/2005 | O'Connor et al. |
| 7,196,708 | B2 | 3/2007 | Dorojevets et al. |
| 7,243,262 | B2 | 7/2007 | Mukherjee et al. |
| 7,277,988 | B2 | 10/2007 | Gower et al. |
| 7,302,532 | B2 | 11/2007 | Sandorfi |
| 7,308,607 | B2 | 12/2007 | Reinhardt et al. |
| 7,467,288 | B2 | 12/2008 | Glossner, III et al. |
| 7,493,516 | B2 | 2/2009 | Ferren et al. |
| 7,584,336 | B2 | 9/2009 | Tremaine |
| 7,594,055 | B2 | 9/2009 | Gower et al. |
| 7,783,860 | B2 | 8/2010 | Luick et al. |
| 7,793,084 | B1 | 9/2010 | Mimar |
| 7,877,582 | B2 | 1/2011 | Gschwind et al. |
| 7,908,460 | B2 | 3/2011 | Liao et al. |
| 7,949,853 | B2 | 5/2011 | Sandon et al. |
| 8,108,652 | B1 | 1/2012 | Hui |
| 8,255,745 | B2 | 8/2012 | Ferren et al. |
| 8,489,919 | B2 | 7/2013 | Clark et al. |
| 8,688,962 | B2 * | 4/2014 | Raikin et al. ................ 712/225 |
| 2004/0193840 | A1 * | 9/2004 | Kirsch ............................ 712/10 |
| 2005/0055543 | A1 * | 3/2005 | Moyer ......................... 712/225 |
| 2006/0143509 | A1 | 6/2006 | Okawa |
| 2007/0050661 | A1 | 3/2007 | Ferren et al. |
| 2008/0005479 | A1 | 1/2008 | Tremaine |
| 2008/0059758 | A1 | 3/2008 | Sachs |
| 2008/0222444 | A1 | 9/2008 | Olofsson et al. |
| 2009/0106526 | A1 | 4/2009 | Luick et al. |
| 2009/0172348 | A1 * | 7/2009 | Cavin ............................... 712/4 |
| 2009/0172364 | A1 * | 7/2009 | Sprangle et al. ............. 712/225 |
| 2010/0036994 | A1 | 2/2010 | Resnick |
| 2010/0049951 | A1 | 2/2010 | Gonion et al. |
| 2010/0122069 | A1 | 5/2010 | Gonion |
| 2010/0268987 | A1 | 10/2010 | Clark et al. |
| 2010/0332764 | A1 | 12/2010 | Jouppi |
| 2011/0145543 | A1 * | 6/2011 | Damron ........................... 712/3 |
| 2011/0153983 | A1 * | 6/2011 | Hughes et al. ................ 712/22 |
| 2011/0161642 | A1 | 6/2011 | Eichenberger et al. |
| 2011/0246828 | A1 | 10/2011 | Monchiero et al. |
| 2011/0264858 | A1 | 10/2011 | Jeddeloh et al. |
| 2012/0047398 | A1 | 2/2012 | Vera et al. |
| 2012/0060015 | A1 | 3/2012 | Eichenberger et al. |
| 2012/0124251 | A1 | 5/2012 | Hnatko et al. |
| 2012/0144089 | A1 * | 6/2012 | Hall et al. ........................ 711/3 |
| 2012/0233507 | A1 | 9/2012 | Gonion |
| 2012/0254591 | A1 * | 10/2012 | Hughes et al. ............... 712/205 |
| 2014/0201498 | A1 * | 7/2014 | Ould-Ahmed-Vall et al. ... 712/4 |

OTHER PUBLICATIONS

David A Patterson, Lecture 6: Vector Processing, 1998, 60 pages, retrieved from the internet on May 7, 2015, retrieved from URL <http://www.cs.berkeley.edu/~pattrsn/252S98/Lec06-vector.pdf>.*

David Patterson and John Hennessy, Computer Architecture A Quantitative Approach, 1996, Morgan Kauffman, Second edition, 4 pages.*

"Cell Architecture Explained Version 2," retrieved from http://www.blachford.info/computer/Cell/Cell0_v2.html on Jul. 23, 2012; pp. 1-3.

A. Fawibe, et al., "New Memory Organizations for 3D DRAM and PCMs," Archictecture of Computing Systems, ARCS 2012—25th International Conference, Proceedings Publication Date: Feb. 29, 2012; pp. 1-12.

H. P. Hofstee, et al., "Power Efficient Processor Architecture and the Cell Processor," IEEE Computer Society 2005; Proceedings of the 11th Int'l Symposium on High-Performance Computer Architecture; pp. 1-5.

IBM, "Logic on DIMM," ip.com; ip.com No. IPCOM000191776D; Jan. 14, 2010; pp. 1-4.

Wikipedia, "Cell (microprocessor)," retrieved from http://en.wikipedia.org/wiki/Cell_%microprocessor%29 on Jul. 23, 2012; pp. 1-17.

* cited by examiner

GATHER/SCATTER OF MULTIPLE DATA ELEMENTS WITH PACKED LOADING/STORING INTO/FROM A REGISTER FILE ENTRY

BACKGROUND

The present invention relates generally to computer memory, and more particularly to packed loading and storing of data to/from memory.

Computer systems often require a considerable amount of high speed memory, such as random access memory (RAM), to hold information, such as data and programs, when a computer is powered and operational. Memory device demands have continued to grow as computer systems have increased performance and complexity.

Communication from a main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell.

A vector processor may support multiple memory accesses in parallel. When data types being accessed have different widths, particularly smaller than a nominal width, gathering the data in parallel and storing the data in parallel can result in inefficient use of memory, such as leaving potentially unusable gaps between data elements stored and read from memory.

SUMMARY

Exemplary embodiments include a method for packed loading and storing of data distributed in a system that includes memory and a processing element. The method includes fetching and decoding an instruction for execution by the processing element. The processing element gathers a plurality of individually addressable data elements from non-contiguous locations in the memory which are narrower than a nominal width of register file elements in the processing element based on the instruction. The data elements are packed and loaded into register file elements of a register file entry by the processing element based on the instruction, such that at least two of the data elements gathered from the non-contiguous locations in the memory are packed and loaded into a single register file element of the register file entry.

Additional exemplary embodiments include a method for packed loading and storing of data distributed in an active memory device that includes memory and a processing element. The method includes fetching and decoding an instruction from an instruction buffer in the processing element for execution by the processing element. Data elements loaded in register file elements of a register file entry of the processing element are unpacked based on the instruction, where at least two of the data elements are unpacked from a single register file element of the register file entry. The processing circuit scatters the data elements to be stored in non-contiguous locations in the memory as a plurality of individually addressable data elements which are narrower than a nominal width of the register file element in the processing element based on the instruction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
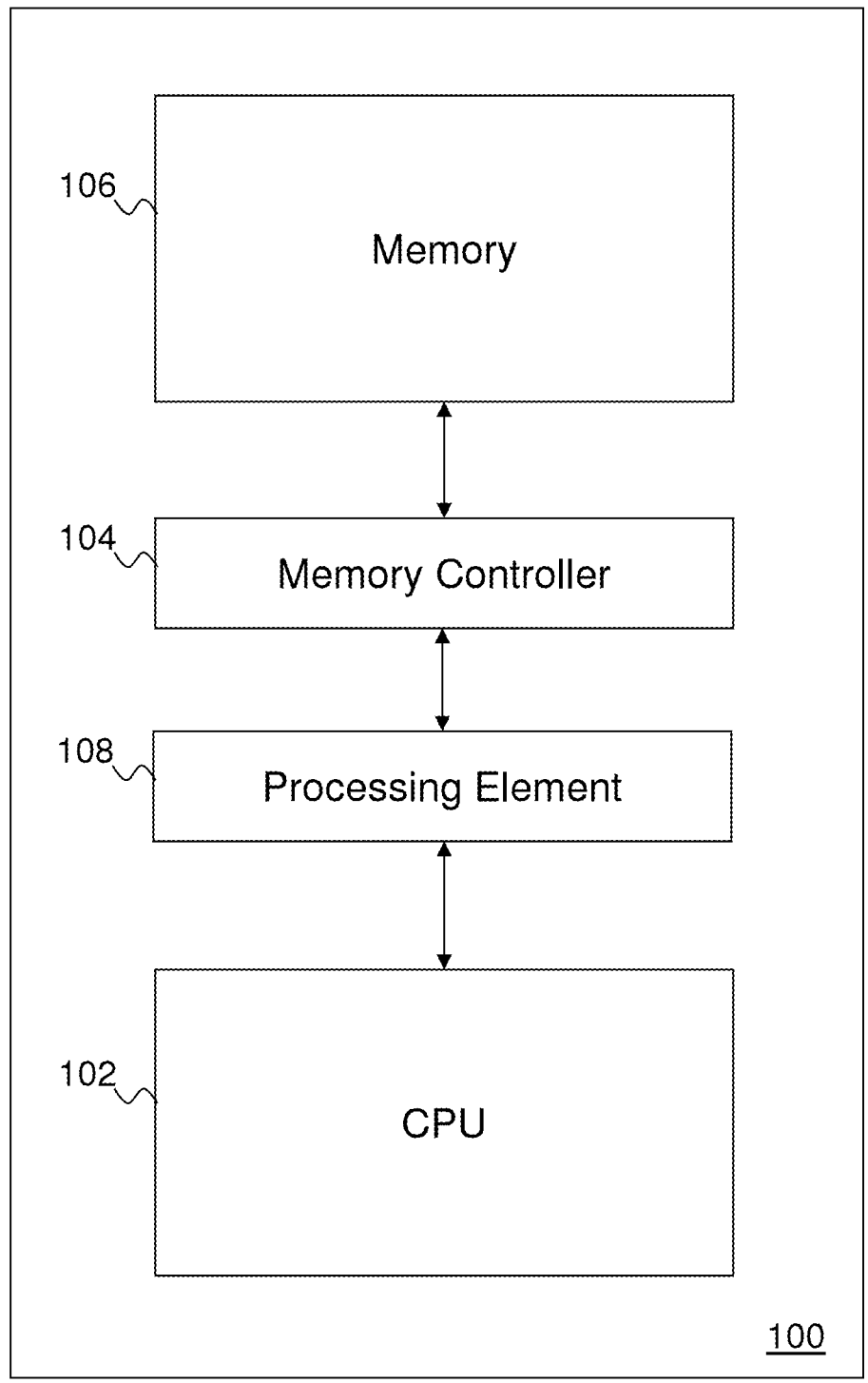
FIG. 1 illustrates a block diagram of a system for active memory in accordance with an embodiment.

An embodiment is directed to packed loading and storing of data in a gather/scatter distribution. Exemplary embodiments as described herein perform packed loading and storing of data in a gather/scatter distribution in an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements on the active memory device as well as between processing elements and a main processor. Each vault may have an associated memory controller or logic unit that is also coupled to the interconnect network.

In embodiments, processing elements are implemented as vector processors. In a vector processor, memory accesses and arithmetic instructions can act upon full vectors or generally continuous portions of vectors, where vectors enable parallel processing on multiple data elements. For some operations, memory accesses or calculations for randomly distributed elements of the vectors may be immaterial. To reduce traffic through a memory hierarchy, and the associated energy consumed, by unnecessary memory accesses, the vector processors include vector mask register files for use in predication of instructions and as targets of comparison instructions. Predication of instructions allows for selective execution of certain elements of the vectors based on a mask.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

In an embodiment, the active memory devices include stateless processing elements within a memory cube. Processing elements appear to a program in the main processor as long latency functional units. The processing elements themselves are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included are address translation capabilities for converting program virtual addresses to real addresses, a unified Load/Store Queue to sequence data movement between the memory and the processing elements, and a Processor Communications Unit, for communication with the main processor.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a virtual address for identifying the location in the memory 106 to which the data will be written. The memory controller 104 stores data at a real address within the memory 106. The computer processor 102 can map the virtual address to a real address in the memory 106 when storing or retrieving data. The real address for a given logical address may change each time data in the memory 106 is modified.

In an embodiment, the processing element 108 is in communication with the computer processor 102 and receives a command from the computer processor 102. The command may correspond to instructions stored in the memory 106 to perform write requests for data to be written to the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
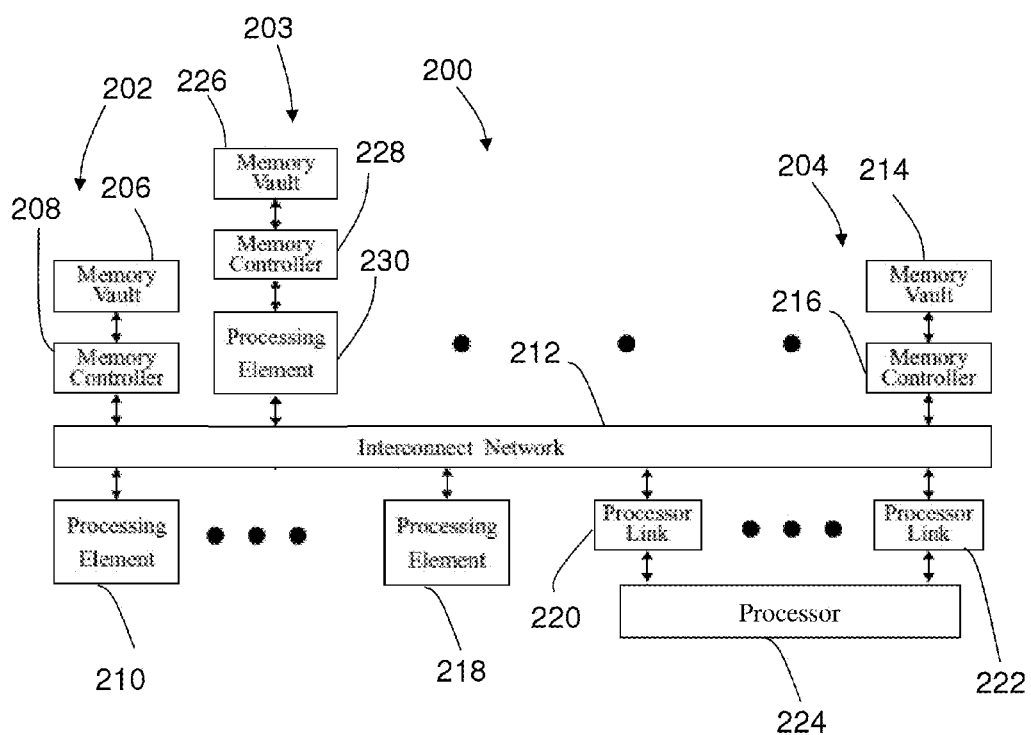
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
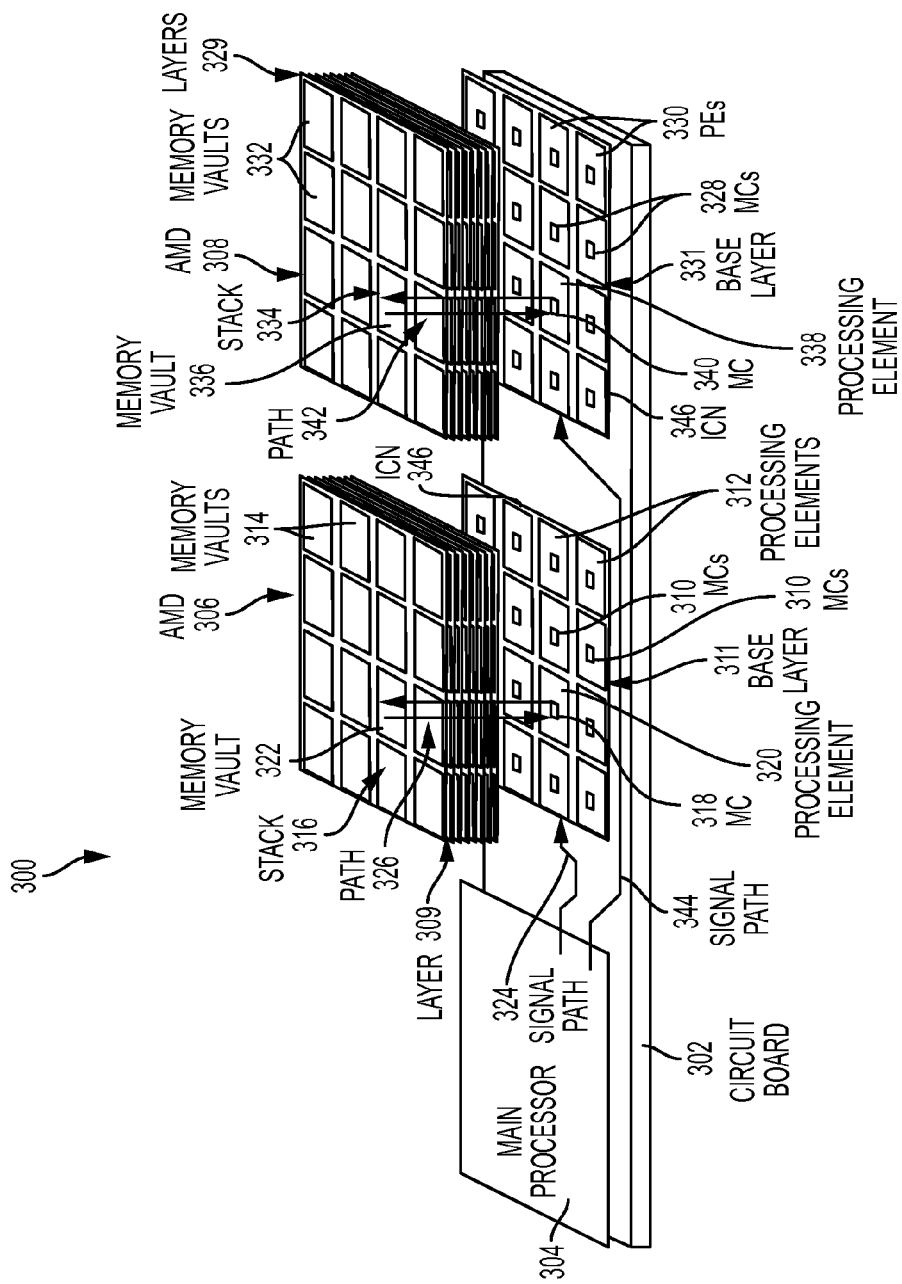
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
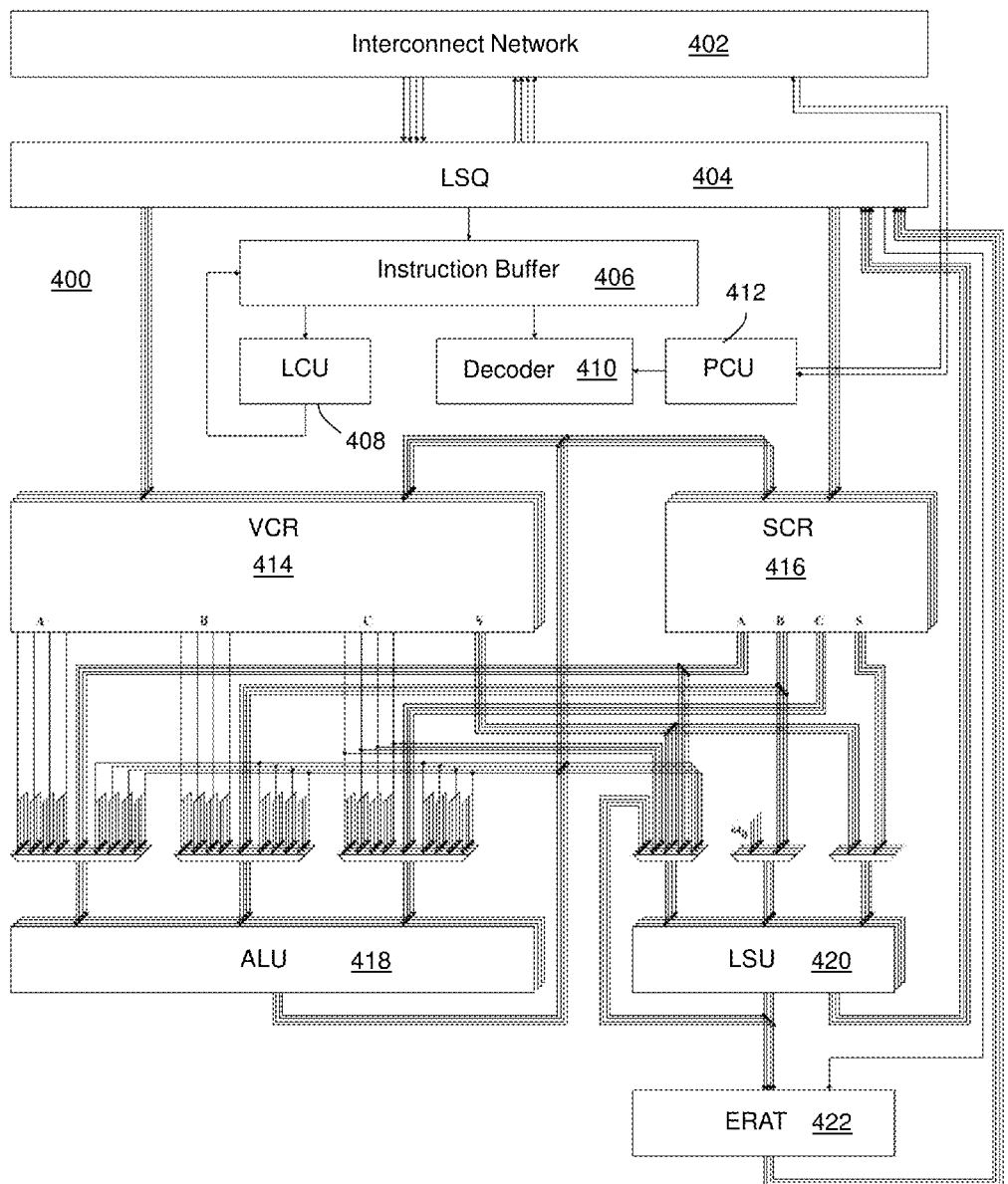
FIG. 4 illustrates a block diagram of a processing element in an active memory device in accordance with an embodiment.

FIG. 4 depicts an example of a processing element 400 coupled to an interconnect network 402 as an embodiment of one of the processing elements of FIGS. 1-3. The processing element 400 is a programmable vector processing element, situated in an active memory device, such as one of the active memory devices of FIGS. 1-3. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order subject to branching. In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction. In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element, and facilitates the gathering and scattering of data from and to memory. Gather/scatter capabilities provide access to data stored in non-contiguous memory locations by realizing multiple vector data element accesses simultaneously, despite their disjoint distribution in non-contiguous memory. The processing element 400 provides the ability to perform associated fixed-point effective address (i.e., virtual address) computations to support gather-scatter functionality. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 register entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5:
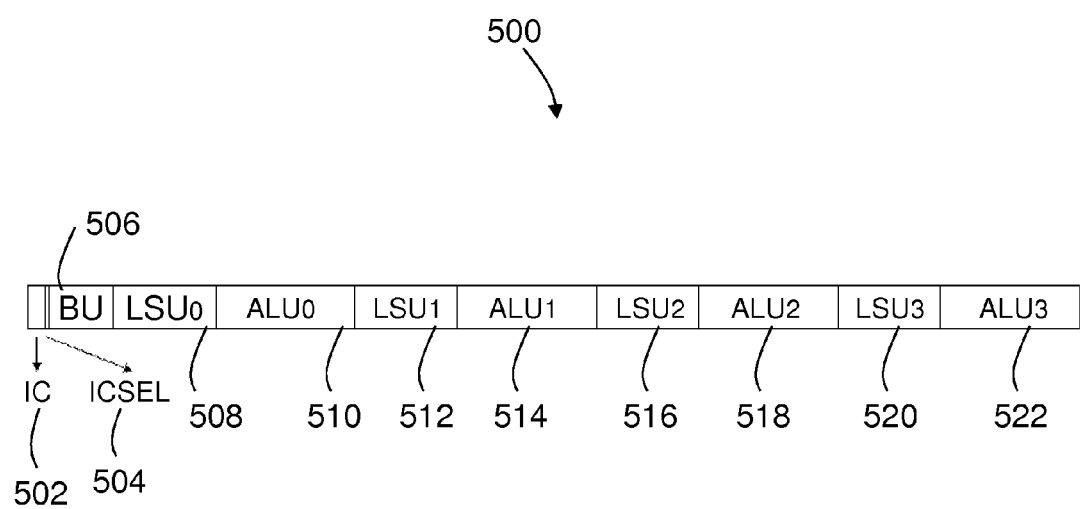
FIG. 5 illustrates an example of a lane instruction format in an active memory device in accordance with an embodiment.

An example of a lane instruction format 500 is depicted in FIG. 5 as a processing element operation which utilizes and controls all of the resources within processing element 400 of FIG. 4. In the example of FIG. 5, the lane instruction format 500 includes a 5-bit iteration count (IC) field 502, a 1-bit iteration count select (ICS) field 504, and nine sub-instructions. The sub-instructions include a 19-bit branch (BU) sub-instruction 506, which executes once and controls the sequence of lane instruction execution, four 31-bit memory access or load-store (LSU) sub-instructions 508, 512, 516, 520 (one per processing slice 0-3), which execute one or more times per lane instruction, and four 41-bit arithmetic-logical (ALU) sub-instructions 510, 514, 518, 522 (one per processing slice 0-3), which execute one or more times per lane instruction. The IC field 502 within a lane instruction, or an iteration count register, as selected by the ICS field 504, determines the number of times that the ALU and LSU sub-instructions are repeated. The BU sub-instruction 506 may be referred to generally as a lane control (LCU) sub-instruction for the LCU 408 and can include other control operations, such as returning, pausing, and no-operation, in addition to branching.

Each sub-instruction is a processor operation which utilizes and controls all of the resources within a given unit within the processing element 400. If a sub-instruction contains all scalar registers in the SCR 416 for the target and source(s), then the sub-instruction can be executed during execution of a first element of the lane instruction. Lane control sub-instructions, including branch sub-instructions, can be executed during execution of the last iteration of the lane instruction. Conditions for branch sub-instructions may be evaluated during execution of the first element of the lane instruction.

Programs configured to execute on the processing element 400 can contain data types of different widths, and the data may be located in a contiguous manner in memory, or it may be scattered about in a random fashion. The processing element 400, which supports multiple-sized data types within its register files such as in VCR 414 and SCR 416, can load its register files with any data type that is arranged in a contiguous manner. The processing element 400 can also support the gathering and scattering of each data type into one entry or vector element of the register files. Rather than limiting register file entries or elements to a fixed bit width or leaving vacant space within an entry or element when loading a data type of a size less than the nominal width of the register file, the processing element 400 can pack smaller data types, whether or not they are arranged in a contiguous manner in memory.

Figure 6:
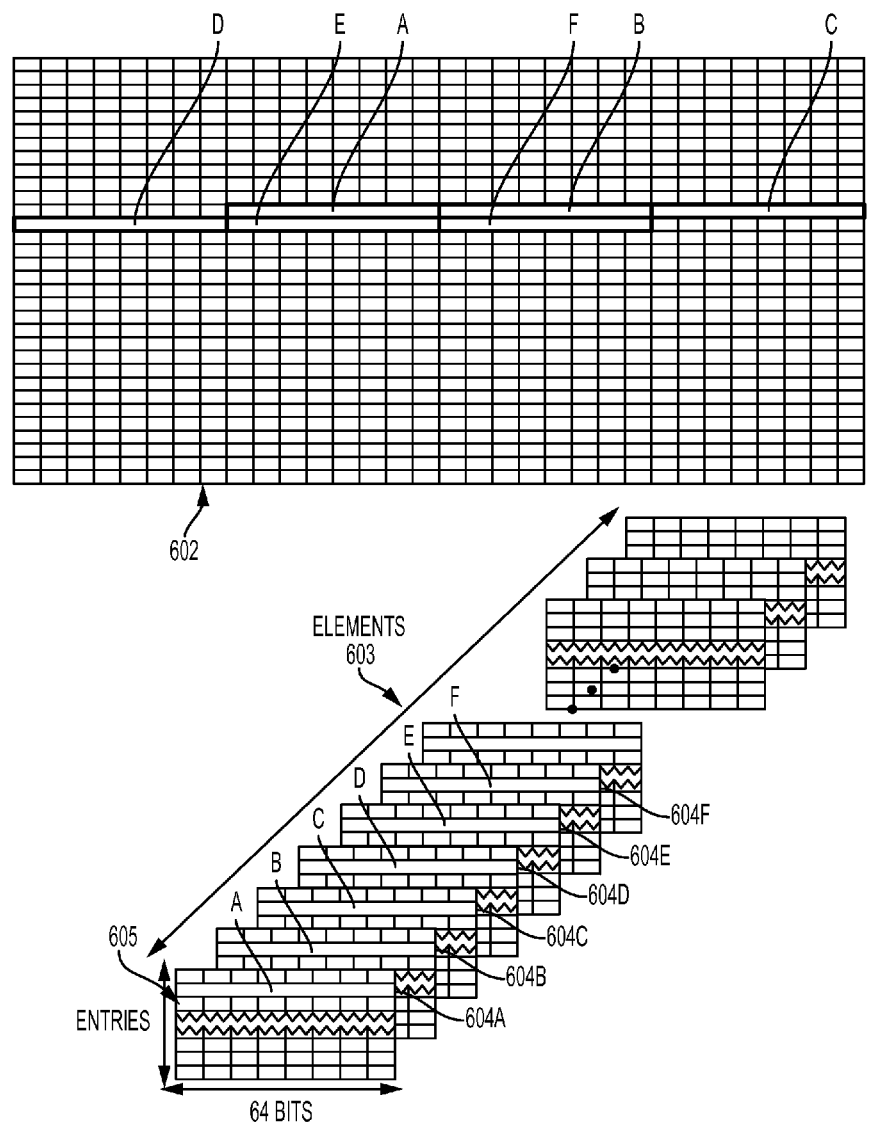
FIG. 6 illustrates an example of data arranged contiguously in memory having a same width as register file elements in accordance with an embodiment.

In exemplary embodiments, the processing element 400 supports gathering and scattering of narrow data types to/from memory into a register file, such as the VCR 414, in a packed fashion in addition to other size and distribution patterns. FIG. 6 shows data which is arranged in memory 602 in a contiguous manner, and which has the same width as the register file elements 604A-604F. The data is loaded into the vector elements of an entry of a vector register file 603, such as VCR 414, having a multiplicity of elements associated with each addressable entry. In the example of FIG. 6, each of the register file elements 604A-604F of register file entry 605 includes 8 bytes (64 bits), and data element values A-F each include 8 byes (64-bits) arranged contiguously across 32-bytes of memory 602.

Figure 7:
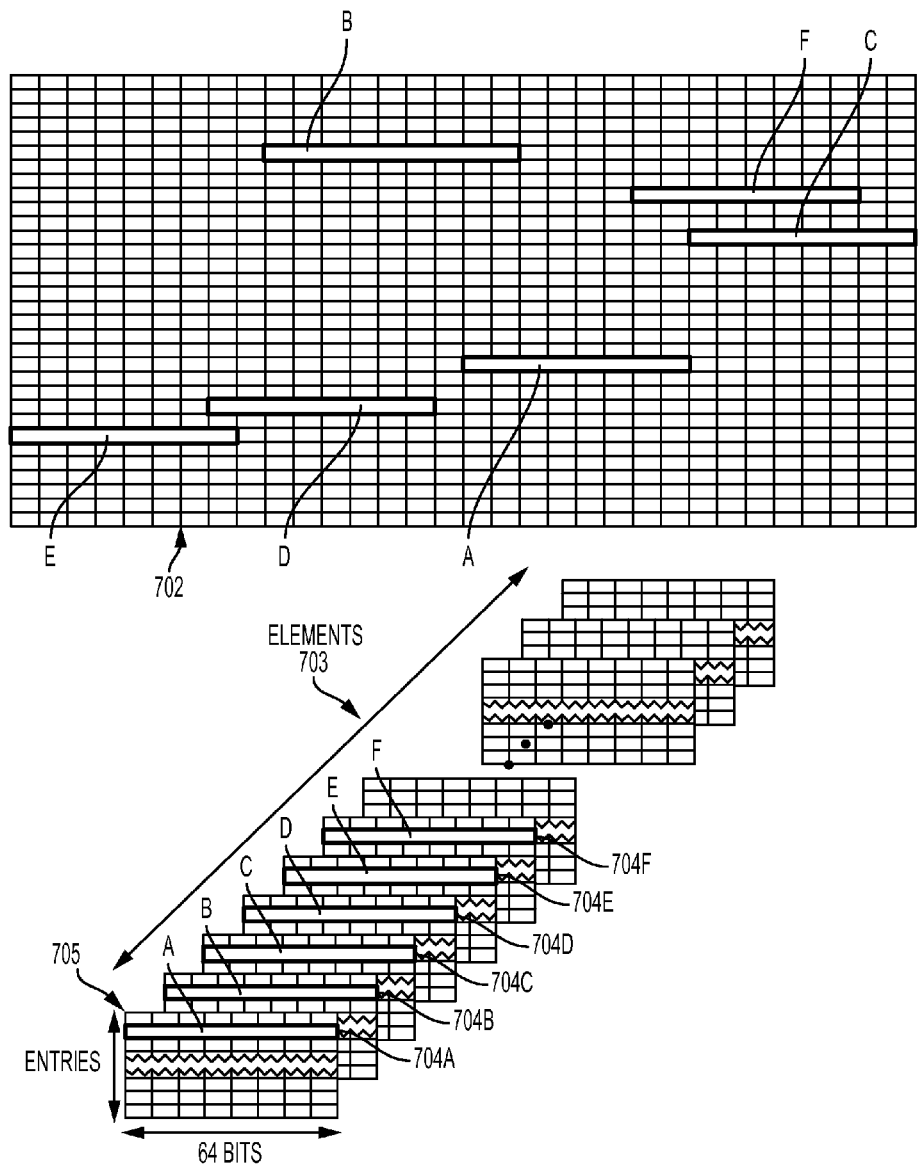
FIG. 7 illustrates an example of data scattered in memory having a same width as register file elements in accordance with an embodiment.

FIG. 7 is similar to the example of FIG. 6, where data in memory 702 has the same width as the register file elements 704A-704F of register file entry 705 in vector register file 703, but with the data is scattered in memory 702 rather than contiguous. Since processing element 400 supports the gathering and scattering of data from/to memory, the processing element 400 can load data element values A-F in FIG. 7 into the register file elements 704A-704F of register file entry 705, with the result being that the data ends up in the vector register file 703 exactly the same as it did in vector register file 603 in FIG. 6 when the data was contiguous in memory 602.

Figure 8:
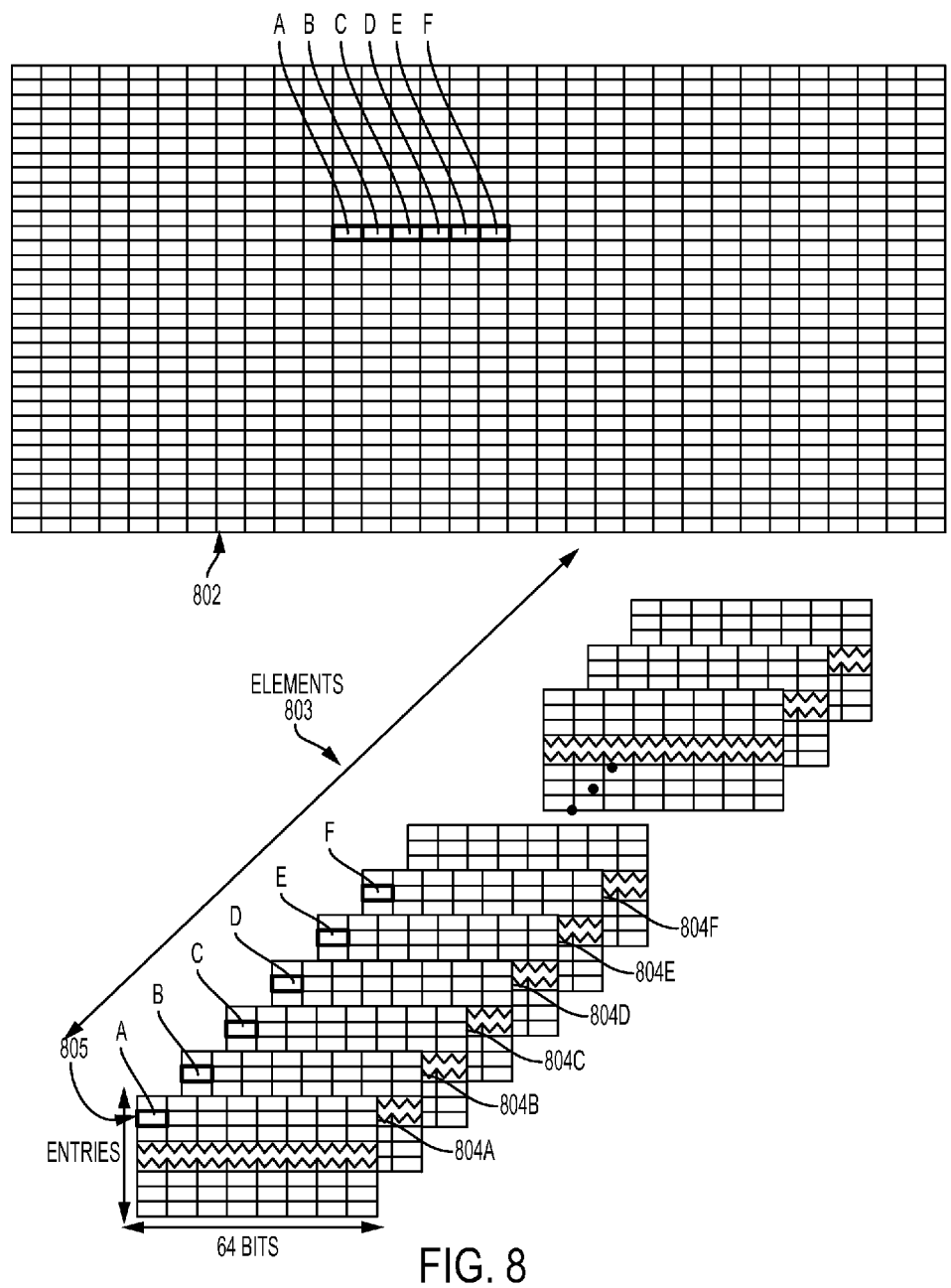
FIG. 8 illustrates an example of data arranged contiguously in memory having a narrower width than register file elements in accordance with an embodiment.

FIG. 8 shows an arrangement of a narrower data type in a contiguous manner in memory 802. The data element values A-F are loaded into register file elements 804A-804F of a register file entry 805, with the extra space of the wider registers left vacant. For example, the data element values A-F are each 1 byte wide in FIG. 8 while the register file elements 804A-804F of a register file entry 805 are each 8 bytes wide in vector register file 803.

Figure 9:
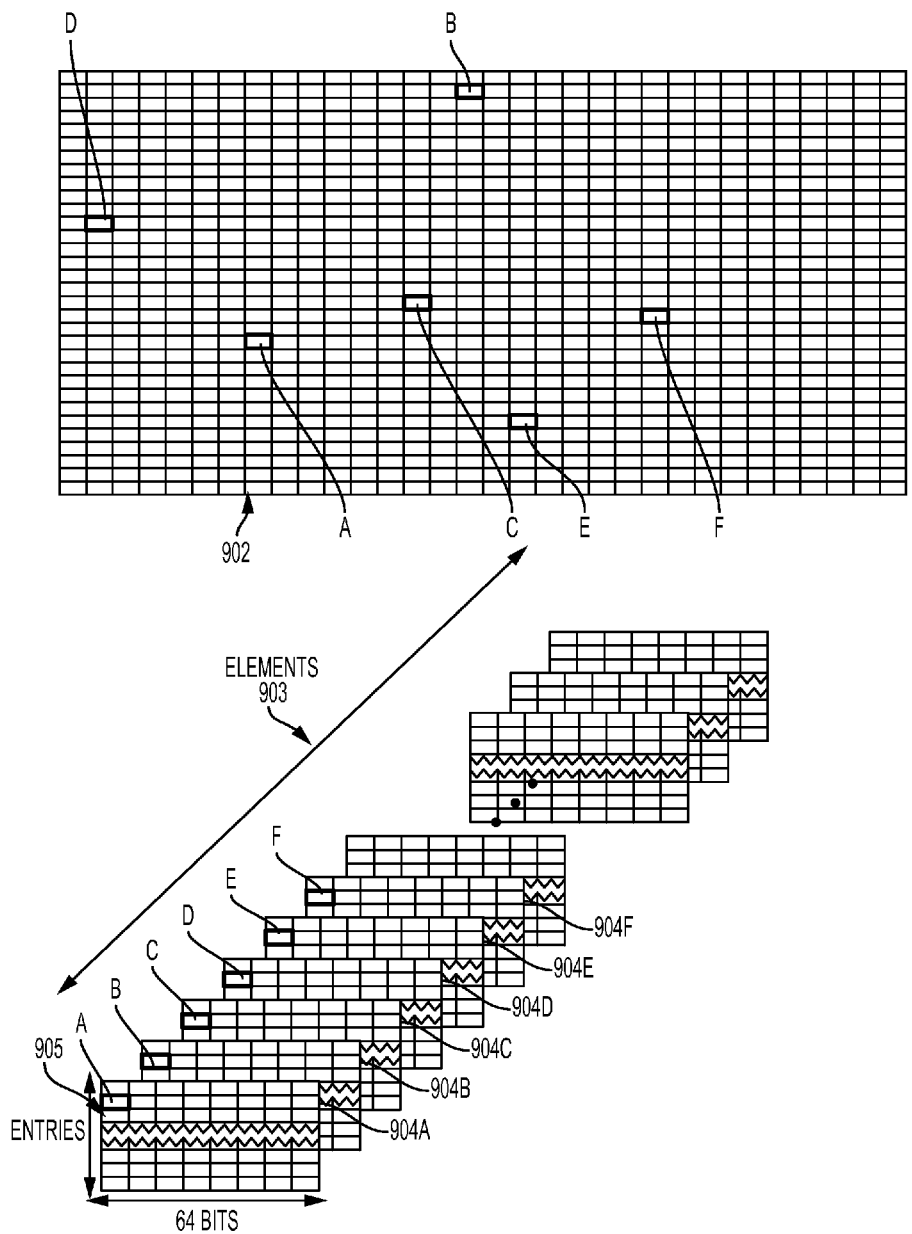
FIG. 9 illustrates an example of data scattered in memory having a narrower width than register file elements in accordance with an embodiment.

FIG. 9 is similar to the example of FIG. 8, where data in memory 902 has a narrower width than the register file elements 904A-904F of register file entry 905 in vector register file 903, but with the data scattered in memory 902 rather than contiguous. Since processing element 400 supports the gathering and scattering of data to/from memory including narrower width data, the processing element 400 can load data element values A-F in FIG. 9 into the register file elements 904A-904F of register file entry 905, with the result being that the data ends up in the vector register file 903 exactly the same as it did in vector register file 803 in FIG. 8 when the data was contiguous in memory 802.

Figure 10:
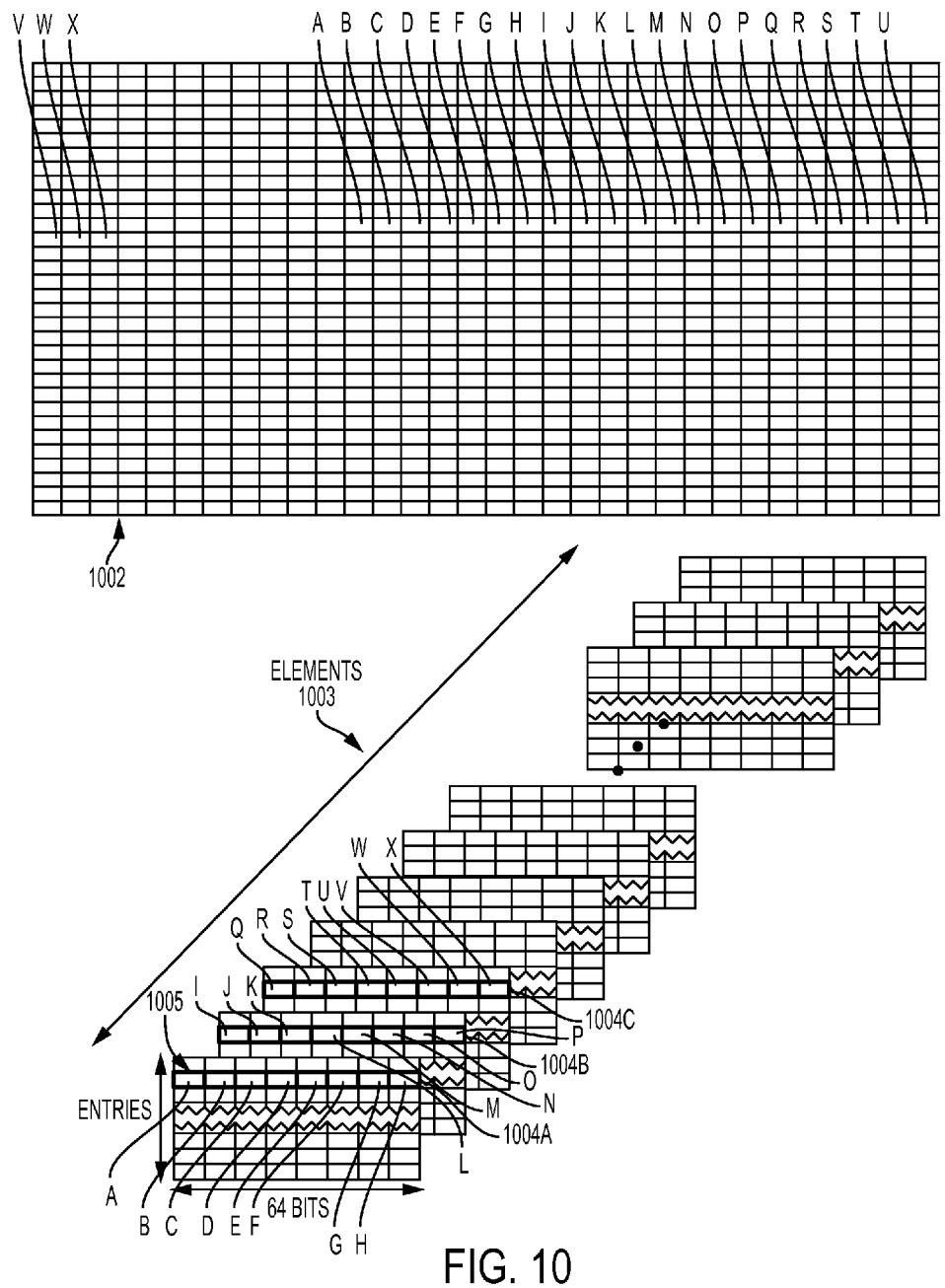
FIG. 10 illustrates an example of data arranged contiguously in memory having a narrower width than register file elements and packed into fewer register file elements in accordance with an embodiment.

FIG. 10 is an example of narrower data types arranged contiguously in memory 1002 being packed into fewer register file elements 1004A-1004C of register file entry 1005 in vector register file 1003 than in register file elements 904A-904F of register file entry 905 of FIG. 9. The data can be loaded as if the data type was the same as in FIG. 6, since it is arranged contiguously.

Figure 11:
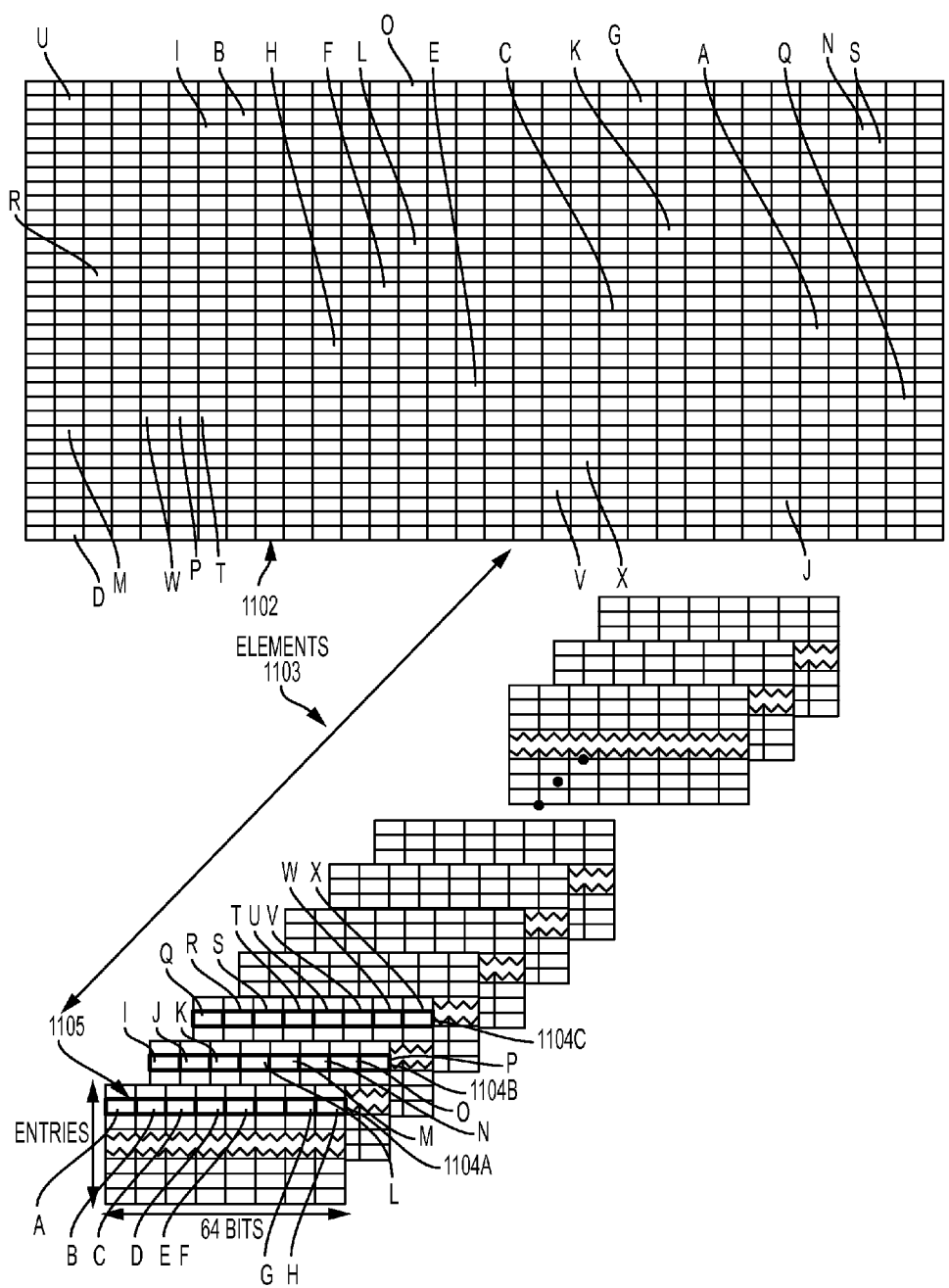
FIG. 11 illustrates an example of data scattered in memory having a narrower width than register file elements and packed into fewer register file elements in accordance with an embodiment.

FIG. 11 shows an embodiment, whereby narrower data is scattered throughout memory 1102, yet is still loaded and packed into fewer register file elements 1104A-1104C of register file entry 1105 in vector register file 1103 than in register file elements 904A-904F of register file entry 905 of FIG. 9.

Figure 12:
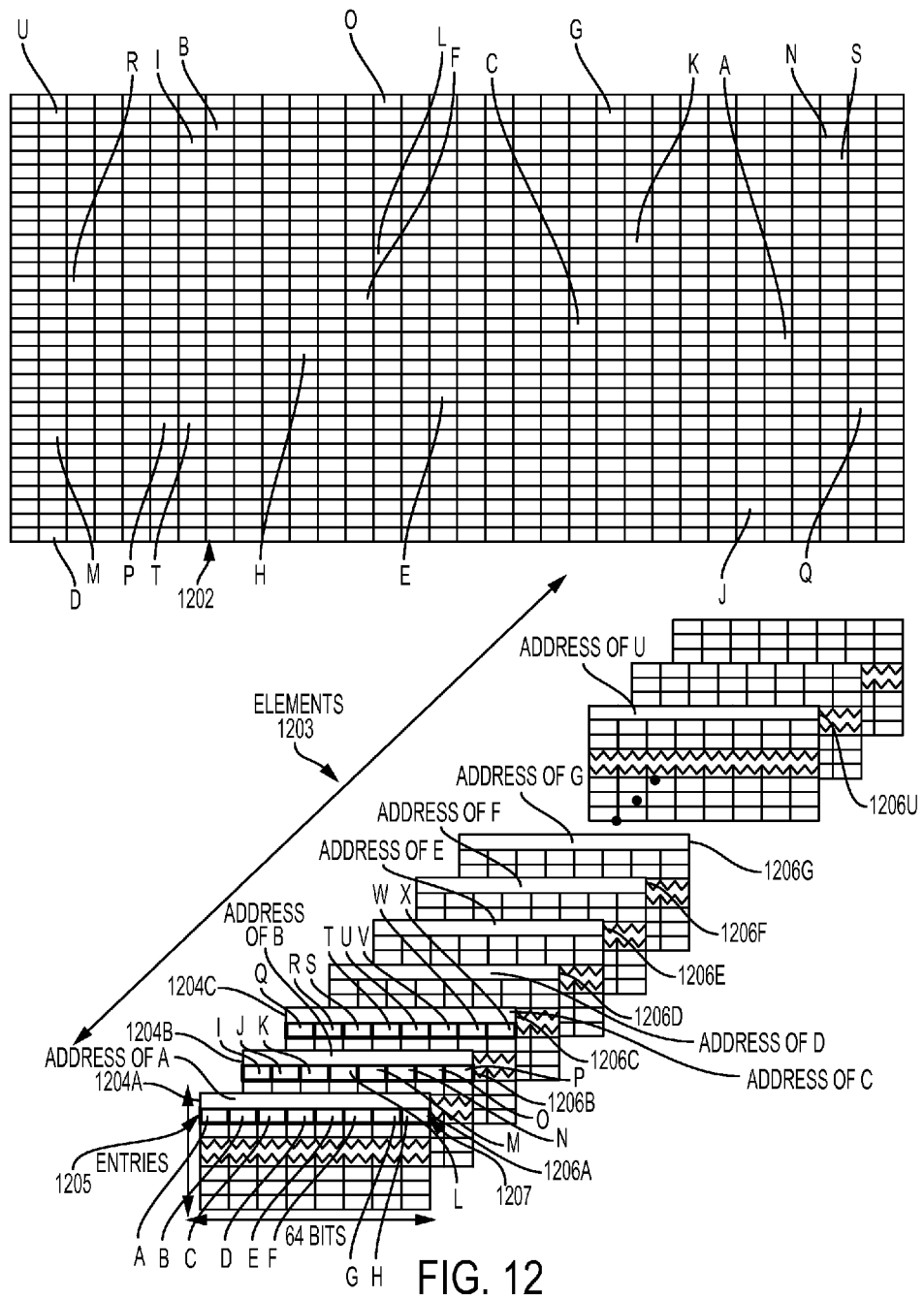
FIG. 12 illustrates an example of packed loading and storing of data in a gather/scatter distribution in accordance with an embodiment.

FIG. 12 illustrates an example of packed loading and storing of data in a gather/scatter distribution in accordance with an embodiment. In FIG. 12, narrower data is scattered throughout memory 1202, yet is still loaded and packed into fewer register file elements 1204A-1204C of register file entry 1205 in vector register file 1203 than in register file elements 904A-904F of register file entry 905 of FIG. 9. FIG. 12 also depicts that addresses of the narrow data elements can be distributed over register file elements 1206A-1206U of register file entry 1207, extending to a greater number of register file elements than the number used to hold the data associated with the addresses in register file elements. For example, data element values A-U are packed into register file elements 1204A-1204C of register file entry 1205, but the addresses associated with the data element values A-U are distributed between register file elements 1206A-1206U of register file entry 1207. Additionally, in the example of FIG. 12, the width of address elements is the same as the register file elements 1206A-1206U (8 bytes wide) in vector register file 1203, while the data element values are 1 byte wide. Additionally, the processing element 400 can support packing and accessing less than the full width of the register file elements, such as register file element 1204C of register file entry 1205 that only packs 5 of 8 bytes.

Figure 13:
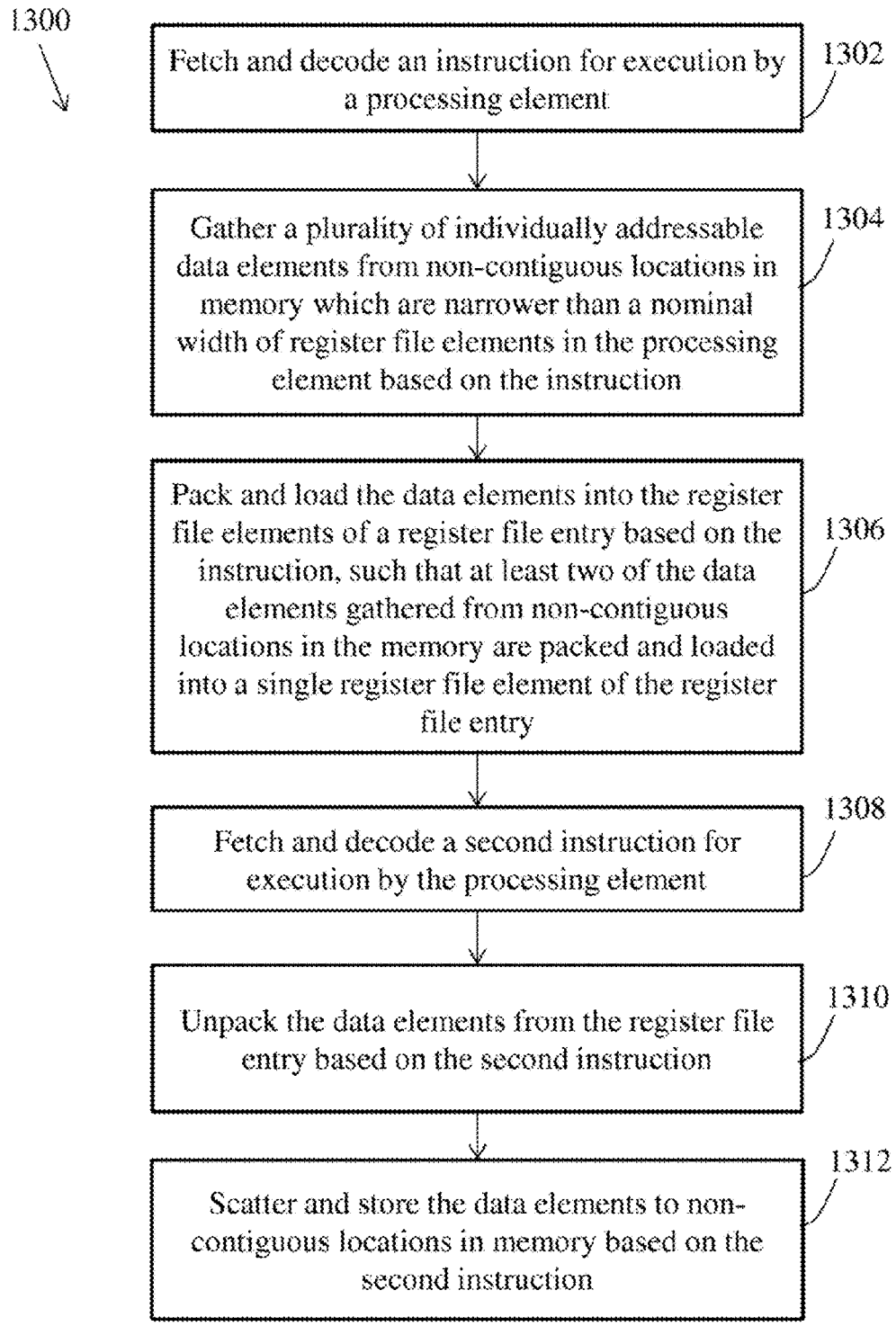
FIG. 13 illustrates a flow diagram of a process for packed loading and storing of data in a gather/scatter distribution in accordance with an embodiment.

FIG. 13 depicts an example process 1300 for packed loading and storing of data in a gather/scatter distribution in an active memory device, such as the active memory devices of FIGS. 1-3. The blocks depicted in FIG. 13 may be performed by one of the processing elements of FIGS. 1-4 in an active memory device. For example, the blocks may be performed by a processing element in an active memory device, where the processing element accesses portions of memory (e.g., memory vaults sharing a stack with the processing element) and performs operations on data accessed from the memory. For purposes of explanation, the processing element is described in reference to processing element 400 of FIG. 4. Although FIG. 13 is described relative to an active memory device, it will be understood that the process of FIG. 13 can be implemented in systems that include a processing element 400 in communication with memory in other configurations, such as memory located remotely from the processing element 400. Accordingly, the processing element 400 need not be located within an active memory device and can perform gather/scatter operations on remotely located memory including, for example, memory located in a separate active memory device.

At block 1302, processing element 400 fetches and decodes an instruction for execution by the processing element 400. The instruction may be fetched from the instruction buffer 406 and decoded by decoder 410.

At block 1304, the processing element 400 gathers a plurality of individually addressable data elements from non-contiguous locations in the memory which are narrower than a nominal width of register file elements in the processing element 400 based on the instruction. For example, the VCR 414 of the processing element 400 can include a plurality of register file entries, where each of the register file entries includes a plurality of register file elements. In the example of FIG. 12, each register file element per register file entry has a width of 8 bytes (64 bits) and supports data elements as narrow as 1 byte (8 bits). Addresses of the non-contiguous locations in the memory of the data elements to gather may be distributed in separate register file elements of a register file entry in the VCR 414. The LSU 420 can use the addresses from the VCR 414 to gather data elements from non-contiguous locations in memory, where each address in the VCR 414 can map to an independent data element to be gathered as part of a single instruction. As previously described, the LSU 420 can operate in parallel with other units, such as ALU 418. The addresses in the VCR 414 can be translated into a physical address by the ERAT 422. As can be seen in the example of FIG. 12, the addresses in the VCR 414 can have a greater width than a width of the data elements (e.g., 8 bytes vs. 1 byte).

At block 1306, the processing element 400 packs and loads the data elements into a register file entry based on the instruction, such that at least two of the data elements gathered from non-contiguous locations in the memory are packed and loaded into a single register file element. Packing and loading the data elements into the register file elements by the processing element 400 based on the instruction can include distributing the packed data elements into fewer register file elements than are consumed by the addresses. For example, in FIG. 12, each address is one 8-byte entry distributed over register file elements 1206A-1206U of register file entry 1207, for a total of 21 full register file elements in register file entry 1207. The data elements associated with the addresses are packed 8:1 into three register file elements 1204A-1204C of register file entry 1205, for a total of two full and one partial register file elements. Therefore, only 21 bytes are occupied for data elements in the example of FIG. 12, while 168 bytes are occupied for addresses. Moreover, the data elements in FIG. 12 are loaded in a contiguous order in the vector register file 1203 even though they are scattered at non-contiguous locations in the memory 1202. The processing element 400 can pack at least a first number of data elements to fill the nominal width of register file elements (e.g., 8 1-byte data elements to fill an 8-byte register file element width for register file element 1204A), and can also pack a second number of data elements into less than the nominal width of register file elements (e.g., 5-byte data elements packed into an 8-byte register file element width for register file element 1204C).

At block 1308, the processing element 400 fetches and decodes a second instruction for execution by the processing element 400. The instruction may be fetched from the instruction buffer 406 and decoded by decoder 410.

At block 1310, the processing element 400 unpacks data elements from the register file entry based on the second instruction. The unpacking of the data elements from the register file entry by the processing element 400 based on the second instruction can include reading the packed data elements as narrower data types (e.g., 1 byte) and reading the addresses as wider data types (e.g., 8 bytes). The processing element 400 can unpack at least a first number of data elements filling the nominal width of register file elements, such as 8 1-byte data elements from register file element 1204A of register file entry 1205, and unpack a second number of data elements occupying less than the nominal width of register file elements, such as 5 1-byte data elements from register file element 1204C of register file entry 1205, where the register file elements in the vector register file 1203 are 8 bytes wide in the example of FIG. 12.

At block 1312, the processing element 400 scatters and stores data elements to non-contiguous locations in memory based on the second instruction. Similar to gathering, scattering can be managed using the VCR 414, LSU 420, and ERAT 422, as well as the LSQ 404. The LSQ 404 can control sequencing of gathering and scattering based on addresses generated by the LSU 420 and translated by the ERAT 420. The addresses of the non-contiguous locations in the memory of the data elements to scatter can be different addresses than the non-contiguous locations in the memory from which the data elements are gathered.

Although the example process 1300 of FIG. 13 has been described in reference to gathering data elements followed by scattering data elements, it will be understood that data elements can be scattered and then gathered. Furthermore, multiple gather and scatter load/store commands can be initiated in parallel across multiple processing slices in the processing element 400. Scattering and gathering can reference a common data set to read/modify/store distributed data values or can operate on different data sets, where a first data set is gathered-read, processed, and a resulting second data set is scattered-written to different non-contiguous memory locations. Additionally, scattering and gathering may be performed independently of each other, where non-contiguous data is gathered, processed and stored contiguously (no-scatter) or contiguous data can be read (no gather), processed, and scattered-written non-contiguously.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for packed loading and storing of data distributed in a system that includes memory and a processing element, the processing element comprising a vector computation register file comprising a plurality of register file entries, each of the register file entries comprising a plurality of register file elements, and the processing element further comprising a scalar computation register file comprising a same number of register file entries as the vector computation register file, each register file entry of the scalar computation register file with one register file element, the method comprising:

fetching and decoding an instruction for execution by the processing element, wherein the instruction comprises at least one sub-instruction accessing the vector computation register file and at least one sub-instruction accessing the scalar computation register file in parallel;

distributing in each of at least two separate register file elements of a first register file entry of the register file entries of the vector computation register file, an address of one of a first plurality of non-contiguous locations in the memory of a plurality of data elements to gather;

gathering, by the processing element based on the instruction and addresses, the data elements from the first plurality of non-contiguous locations in the memory, wherein each of the data elements is individually addressable and is narrower than a width of the register file elements of the vector computation register file in the processing element; and packing and loading the data elements into one or more of the register file elements of a second register file entry of the register file entries of the vector computation register file by the processing element based on the instruction, such that at least two of the data elements gathered from the first plurality of non-contiguous locations in the memory are packed and loaded into a single register file element of the second register file entry as a plurality of packed data elements in parallel with performing the at least one sub-instruction accessing the register file entries of the scalar computation register file.

2. The method of claim 1, wherein each of the addresses comprises a greater width than a width of each of the data elements.

3. The method of claim 2, wherein packing and loading the data elements into the one or more of the register file elements further comprises distributing the packed data elements into fewer register file elements than are consumed by the addresses, and the second register file entry is subsequent to the first register file entry in the vector computation register file.

4. The method of claim 1, further comprising:
packing at least a first number of the data elements to fill the width of the register file elements of the vector computation register file; and
packing a second number of the data elements into less than the width of the register file elements of the vector computation register file.

5. The method of claim 1, further comprising:
fetching and decoding a second instruction for execution by the processing element;
unpacking the data elements from the second register file entry by the processing element based on the second instruction; and
scattering and storing, by the processing element, the data elements to a second plurality of non-contiguous locations in the memory based on the second instruction.

6. The method of claim 5, wherein a plurality of addresses of the second plurality of non-contiguous locations in the memory of the data elements to scatter are distributed in separate register file elements of the vector computation register file.

7. The method of claim 6, wherein the addresses of the second plurality of non-contiguous locations in the memory of the data elements to scatter are different addresses than the addresses of the first plurality of non-contiguous locations in the memory from which the data elements are gathered.

8. The method of claim 6, wherein unpacking the data elements from the second register file entry by the processing element based on the second instruction further comprises reading the packed data elements as narrower data types and reading the plurality of addresses of the second plurality of non-contiguous locations in the memory as wider data types as compared to the narrower data types.

9. The method of claim 6, further comprising:
unpacking at least a first number of the data elements filling the width of the register file elements; and
unpacking a second number of the data elements occupying less than the width of the register file elements.

10. A method for packed loading and storing of data distributed in an active memory device that includes memory and a processing element, the processing element comprising a vector computation register file comprising a plurality of register file entries, each of the register file entries comprising a plurality of register file elements, and the processing element further comprising a scalar computation register file comprising a same number of register file entries as the vector computation register file, each register file entry of the scalar computation register file with one register file element, the method comprising:

fetching and decoding an instruction from an instruction buffer in the processing element for execution by the processing element, wherein the instruction comprises at least one sub-instruction accessing the vector computation register file and at least one sub-instruction accessing the scalar computation register file in parallel;

unpacking a plurality of data elements loaded in one or more of the register file elements of a second register file entry of the register file entries of the vector computation register file based on the instruction, wherein at least two of the plurality of data elements are unpacked from a single register file element of the second register file entry; and scattering and storing, by the processing element, the plurality of data elements to a plurality of non-contiguous locations in the memory based on the instruction and a plurality of addresses in parallel with performing the at least one sub-instruction accessing the register file entries of the scalar computation register file, wherein each of the plurality of data elements is individually addressable and is narrower than a width of the plurality of register file elements of the vector computation register file, wherein an address of one of the non-contiguous locations in the memory of each of the data elements to scatter is distributed in each of at least two separate register file elements of a first register file entry of the register file entries of the vector computation register file.

11. The method of claim 10, wherein the active memory device is a three-dimensional memory cube, the memory is divided into three-dimensional blocked regions as memory vaults, and the non-contiguous locations in the memory are accessed through one or more memory controllers in the active memory device.

12. The method of claim 10, wherein the unpacking of the plurality of data elements is performed by a load-store unit in parallel with instruction processing by an arithmetic-logic unit.

13. The method of claim 12, wherein the vector computation register file is accessible by the load-store unit and the arithmetic-logic unit, wherein each of the plurality of addresses comprises a greater width than a width of each of the plurality of data elements.

14. The method of claim 13, wherein unpacking the plurality of data elements from the one or more of the register file elements by the processing element further comprises reading packed data elements as narrower data types and reading the plurality of addresses as wider data types as compared to the narrower data types.

15. The method of claim 13, further comprising:
fetching and decoding a second instruction from the instruction buffer of the processing element for execution by the processing element;
gathering, by the processing element, a set of data elements from a set of non-contiguous locations in the memory based on the second instruction; and
packing and loading the set of data elements into a set of register file elements of a third register file entry of the vector computation register file by the processing element based on the second instruction.

16. The method of claim 15, wherein packing and loading the set of data elements into the set of register file elements by the processing element based on the second instruction further comprises distributing the set of packed data elements into fewer register file elements than are consumed by a plurality of addresses of the set of the non-contiguous locations in the memory to gather.

17. The method of claim 16, wherein the plurality of addresses of the non-contiguous locations in the memory of the data elements to scatter are different addresses than the plurality of addresses of the set of non-contiguous locations in the memory from which the set of data elements are gathered.

18. The method of claim 15, further comprising:
packing at least a first number of the set of data elements to fill a width of the set of register file elements; and
packing a second number of the set of data elements into less than the width of the set of register file elements.

* * * * *